Patented Mar. 12, 1940

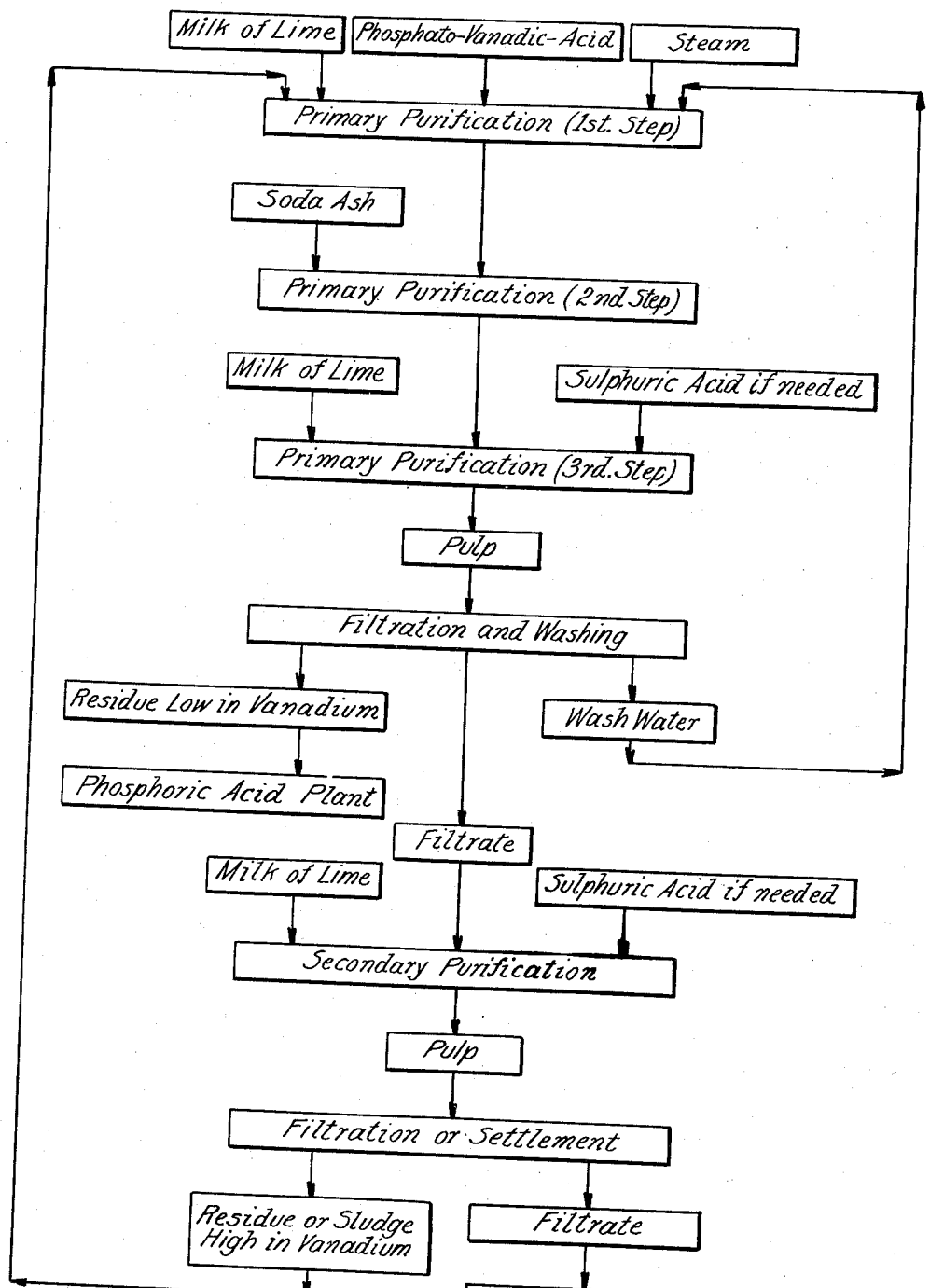

2,193,092

UNITED STATES PATENT OFFICE 2,193,092

RECOVERY OF VANADIUM

Frederick F. Frick and Frank W. Woodman, Anaconda, Mont., assignors to Anaconda Copper Mining Company, New York, N. Y., a corporation of Montana Application December 16, 1937, Serial No. 180,202

12 Claims. (Cl. 23—24)

This invention relates to the recovery of vanadium and has for an object the provision of a method or process for recovering vanadium in the form of a commercially pure vanadium compound from impure-vanadium-bearing materials. A particular object of the invention is to provide a method or process for separating vanadium from phosphorus contained in substantially water-insoluble complex compounds of phosphorus and vanadium.

The method or process of the invention involves the treatment of solid vanadium-bearing material containing phosphorus such, for example, as phospho-vanadic acid in an aqueous medium with a compound of an element capable of combining with phosphorus contained in the material, preferentially with respect to the vanadium, to form a phosphate substantially insoluble in the aqueous medium with the liberation of soluble vanadic acid, thus to produce a solution of vanadic acid and a solid residue containing phosphorus and some vanadium. The vanadic acid solution and the residue may be separated and treated independently, if desired, or they may be treated further while in contact to effect a further separation of phosphorus and vanadium. In the preferred process of the invention, the solution and the solid residue in contact are subjected to the action of a compound of an element capable of combining with vanadium contained therein, preferentially with respect to phosphorus, to form a soluble vanadate, thus to produce a vanadate solution containing only a small amount of phosphorus and a solid residue substantially free of vanadium, or containing only a small amount of vanadium, and containing a large proportion of the phosphorus originally present in the vanadium-bearing material from which the residue was derived.

The vanadate solution and the solid residue thus obtained may be separated and treated independently, if desired, or they may be treated further while in contact to effect a further separation of phosphorus and vanadium. In the preferred process of the invention, the vanadate solution and the solid residue in contact are subjected to the action of a compound of an element capable of combining with phosphorus contained therein, preferentially with respect to the vanadium, to form a phosphate substantially insoluble in the vanadate solution, thus to further reduce the amount of phosphorus in the vanadate solution and to produce a vanadate solution substantially free of, but which may contain some, phosphorus and a solid residue or precipitate containing a relatively large amount of phosphorus and only a small amount of vanadium.

In order to further reduce the amount of phosphorus in the vanadate solution, the solution and the solid residue may be separated as by filtration or decantation, and the solution may be treated again, under controlled conditions, with a compound of an element capable of combining preferentially with phosphorus to form a phosphate substantially insoluble in the solution.

In one of its limited aspects, the process of the invention involves a series of treatments and re-treatments of the vanadium and phosphorus-bearing materials and the various solutions obtained, under conditions controlled with respect to such factors as temperatures, types and quantities of reagents and hydrogen ion concentrations, to produce ultimately a vanadate solution of the desired purity with respect to phosphorus.

Thus for example, in the treatment of raw material containing phosphato vanadic acid, the material is treated in an aqueous medium at an elevated temperature (60° C., for example) with a compound of an alkaline earth metal such as a calcium compound, for example, lime or calcium hydroxide. The amount of calcium compound, such as lime or calcium hydroxide, employed in this treatment preferably is less than that required to provide calcium for combining with the phosphorus alone. The calcium reacts with the phosphorus, producing substantially insoluble calcium phosphate and liberating vanadic acid, with the production of a vanadic acid solution and an insoluble residue. The vanadic acid solution and the residue (still maintained at about 60° C.) are subjected to the action of a compound of an alkali metal such as sodium carbonate. The amount of sodium carbonate employed is sufficient, but not substantially in excess of the amount required, to provide sodium for combining with all of the vanadium alone. The sodium reacts with the vanadium, forming soluble sodium vanadate. The hydrogen ion concentration of the sodium vanadate solution thus formed preferably is equivalent to a pH of about 7.5 to 7.7. The vanadate solution at this stage is substantially free of phosphorus, but it may contain a small amount in excess of about 5 grams per liter. In order to further reduce the amount of phosphorus present, say to about 3 to 5 grams per liter, the sodium vanadate solution is subjected to the action of a calcium compound such as calcium hydroxide or lime to establish in the solution a hydrogen ion concentration equivalent to a pH of about 9.0. This treatment usually is sufficient to reduce the phosphorus content to about 3.0 to 5.0 grams per liter. If such reduction is not effected, the solution may be treated with an acid such as sulphuric acid to increase its hydrogen ion concentration and the resulting solution may be treated with a calcium compound in amount and character such as to re-establish a hydrogen ion concentration equivalent to a pH of about 8.8 to 9.2. The alternate treatment with acid and calcium compound may be carried out as often as may be necessary to reduce the phosphorus content of the solution to the desired value.

In the preferred complete process of the invention, the sodium vanadate solution containing about 3 to 5 grams per liter of phosphorus is separated from the precipitates and residues and subjected to the action of a calcium compound such as lime or calcium hydroxide at an elevated temperature (about 60° C., for example). The amount and character of the calcium compound employed are such as to establish in the solution a hydrogen ion concentration equivalent to a pH of about 10.2 to 10.6. Usually, this treatment is sufficient to reduce the phosphorus content to a trace. If such reduction is not accomplished, alternate treatments with acid and calcium compound to increase the hydrogen ion concentration and again reduce it to a value equivalent to a pH of about 10.2 to 10.6 may be carried out.

The resulting purified vanadate solution may be employed for any purpose for which such a solution is useful, for example, as a reagent, as a source of sodium vanadate or as a source of substantially phosphorus-free elemental vanadium.

The process of the invention is particularly useful in the recovery of vanadium from vanadium and phosphorus-bearing by-products obtained in processes for producing phosphoric acid by treatment of phosphate rock containing small amounts of vanadium. Therefore, the process of the invention will be described more particularly hereinafter with reference to its use in treating such by-products.

Certain phosphate rocks contain vanadium, and, in the process of leaching these rocks with sulphuric acid for the preparation of phosphoric acid, most of the vanadium goes into solution in the tetravalent form. When the impure phosphoric acid is evaporated to 53° Bé. and treated under suitable conditions with an oxidizing agent such as sodium chlorate, the tetravalent vanadium is oxidized to the quinquevalent oxide form which combines with phosphoric acid to form hydrates such as

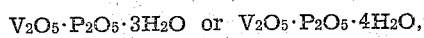
$V_2O_5 \cdot P_2O_5 \cdot 3H_2O$ or $V_2O_5 \cdot P_2O_5 \cdot 4H_2O$, which are relatively insoluble in water at ordinary atmospheric temperatures. These hydrates, phosphato vanadic acids (hereinafter called P. V. A.), are yellow crystalline compounds readily separated from the phosphoric acid by settlement and filtration.

P. V. A. contains phosphorus as a constituent and, as obtained from phosphoric acid processes, is associated with impurities such as gypsum, silico fluorides, iron and alumina. As the most of the vanadium produced goes into vanadium steels and as phosphorus is a highly undesirable impurity in steel, the elimination of phosphorus from vanadium compounds destined for alloy making, is of the utmost importance. Vanadium pentoxide for steel making must not contain more than .02% phosphorus. As P. V. A. contains about twenty-one percent (21%) vanadium and fourteen percent (14%) phosphorus and since these elements are similar in chemical properties, the recovery of a vanadium pentoxide product containing a suitable amount of vanadium (about 55%) and .02% phosphorus presents a problem which has been difficult of solution.

By the process of the invention hereinafter described, P. V. A. can be treated with simple reagents, milk of lime, soda ash and sulphuric acid, in carefully controlled amounts and under carefully controlled conditions with the separation of the phosphorus and incidentally other impurities, and the production of commercially pure vanadium pentoxide containing less than .02% phosphorus.

P. V. A. consists of the anhydrides of vanadic and phosphoric acids, and suitable reagents for decomposition include alkaline substances such as soda ash and milk of lime. The objective of the treatment of the invention is to throw as much of the vanadium as possible into the form of a soluble vanadate, sodium vanadate for example, and substantially all the phosphorus into an insoluble phosphate such as dicalcium phosphate, so that by filtration a separation can be made. Lime, (CaO) has a preferential affinity for phosphorous over vanadium and, under suitably controlled conditions, forms calcium phosphate in preference to calcium vanadate. Taking advantage of this fact, the process is carried out in two stages. In the first stage, having used sufficient soda ash to satisfy all the vanadium, with an insufficient amount of lime (CaO) to satisfy the phosphorus and with controlled alkalinity, a residue containing much phosphorus and a small amount of vanadium is produced and returned to the phosphoric acid plant for retreatment. The solution from the first stage is contaminated with phosphorus, and to it, is added milk of lime in sufficient excess to throw down substantially all the phosphorus and some vanadium. A solution substantially free of phosphorus and a residue high in vanadium are obtained, the residue being returned to the first stage of the preceding cycle. As explained in the later description of a specific embodiment of the process, the desired alkalinity or hydrogen ion concentration (pH) may be obtained and controlled by the use of sulphuric acid or lime salts.

The vanadium pentoxide is precipitated from the purified solution with sulphuric acid by conventional methods.

The specific embodiment of the process is illustrated in the accompanying flow sheet and the following description. It is to be understood that the invention is not confined to the specific conditions described and shown in the flow sheet and description and that conditions may be varied to meet requirements. The embodiment described and illustrated serves to explain the principles of the process.

The following description of the preferred specific embodiment can be better understood by reference to the accompanying flow sheet.

The P. V. A. for treatment is separated from the phosphoric acid and washed with water by filtration, centrifuging or decantation.

In the preferred process of the invention, the separation of vanadium from impurities, or purification, is accomplished in two stages, (1) Primary purification and (2) Secondary purification. Primary purification is conducted in three steps with no separation of solids and solution until after the third step is completed, when the pulp is filtered. Secondary purification is conducted in one step with separation of solids from solution after completion of the operation, by filtration or decantation.

In the first step of primary purification 320 pounds of P. V. A., containing about 21% vanadium and 14% phosphorus, are agitated with returned wash water in a suitable tank along with the impure residue from the secondary purification stage of the previous cycle. The pulp is heated to about 60° C. with live steam. About 50 pounds of CaO, in the form of milk of lime are added and the pulp is agitated for about an hour. P. V. A. is first treated with lime for two reasons, first to utilize the excess lime and recover the vanadium from the secondary purification residue of the preceding cycle, and second to accomplish a part of the decomposition with milk of lime rather than the more expensive soda ash used later. The chemistry at this stage probably is complex. The P. V. A. is partly decomposed by the lime treatment with the production of solution containing vanadium and an insoluble residue. The insoluble residue probably contains phosphates of lime, vanadium, iron and alumina. The solution probably contains monocalcium phosphate, acid calcium vanadates and perhaps some vanadic acid.

Residue and solution should not be separated at this point as decomposition of P. V. A. is not complete.

In the second step of primary purification, from 150 to 200 pounds soda ash are gradually added until the pH of the solution reaches about 7.5 to 7.7 to Phenol red as an indicator. Decomposition is completed by the soda ash and the solution could be separated from the solids at this stage but there would be no advantage in doing this. The solids probably consist of phosphates of lime, alumina, iron, etc. The solution probably carries most of the vanadium as sodium vanadate also sodium phosphates and perhaps it may still contain some monocalcium phosphate. There is insufficient lime available to combine with phosphorus to the desired extent.

In the third step additional CaO, in the form of milk of lime, some 20 to 30 pounds, is now added until the pH of the solution reaches 8.8 to 9.2 and until the phosphorus in solution is reduced to 3 to 5 grams per liter. In some cases when the pH reaches about 8.8 to 9.2 the phosphorus has not been reduced to 3 to 5 grams per liter, in which case some sulphuric acid say 10 pounds may be added followed by CaO, in the form of milk of lime, to again reach a pH of about 8.8 to 9.2. This alternate treatment with sulphuric acid ($H_2SO_4$) and lime (CaO) is continued until the phosphorus content of the solution is reduced to the desired amount. The phosphorus is precipitated, probably as di-calcium phosphate, to the extent that CaO is available.

This is one of the critical points of the process. The objective at this stage is precipitation of a minimum amount of vanadium but, at the same time, the precipitation of a large proportion of the phosphorus, and it is here that careful control is necessary. If pH is too high, that is, if too great alkalinity is attained, too much vanadium is precipitated. Sufficient lime (CaO) to satisfy the phosphorus precipitated must be available, but if the requirement is all furnished in the form of milk of lime the alkalinity, pH, may go too high. Hence the necessity in some cases of providing available lime (CaO) without additional alkalinity. This may be accomplished by alternate additions of sulphuric acid and milk of lime as described above or by addition of some lime salt such as calcium chloride.

It should be understood that the use of sulphuric acid is not necessarily regular practice. Actually, in some 50 laboratory cycles of operation, the use of sulphuric acid was resorted to only 3 or 4 times. It proved useful and effective when required.

The chemistry of the process through the primary purification probably is very complex. Phosphorus and vanadium form mono-, di- and tri-basic salts with sodium and calcium, and the compounds formed in the various steps of the primary purification would be difficult of identification. However, it is the end result which is of importance. The results of many cycles show that when the operation is conducted as above described most of the vanadium is retained in solution as a sodium vanadate and most of the phosphorus is in the residue. It is essential that a certain minimum proportion of soda ash to vanadium in P. V. A., be used. The proportion may vary from 2 to 2.5 pounds soda ash per pound of vanadium, but not less than 2 pounds should be used. If not enough soda ash is used the primary purification cake will run too high in vanadium.

Having attained the proper hydrogen ion concentration (pH) and having reduced the phosphorus in solution to from 3 to 5 grams per liter, the pulp is filtered and the cake is well washed. With proper control and washing the cake will carry not more than five percent (5%) of the vanadium in the P. V. A. treated. This cake is returned to the phosphoric acid plant for recovery of vanadium and phosphorus pentoxide ($P_2O_5$).

The partly purified solution is passed to a tank with an agitator and heated to 60° C. for secondary purification. Lime, (CaO) in the form of milk of lime, 30 to 40 pounds, is now added until the pH reaches about 10.2 to 10.6 (using Nitro yellow as an indicator) or until only a trace of phosphorus is left in solution. Here again alternate additions of sulphuric acid ($H_2SO_4$) and lime (CaO) may be made if desirable. The objective of secondary purification is the obtainment of a solution containing a minimum amount of phosphorus. A considerable excess of milk of lime is used to assure phosphorus elimination, and a considerable amount of vanadium may be precipitated as a calcium vanadate. However, within reason, this is not a matter of importance as the residue from secondary purification goes back into the first step of primary purification of the next cycle. The residue may be separated from the solution by filtration or preferably by settlement and decantation if not too bulky.

By these two purification steps substantially all the phosphorus in the P. V. A. is separated from the vanadium. The phosphorus is largely eliminated in the first stage in a residue low in vanadium, and, from the second stage, is produced a substantially pure sodium vanadate solution for subsequent precipitation of vanadium pentoxide ($V_2O_5$) with sulphuric acid.

In the course of the purification, other impurities in addition to phosphorus are removed in the primary purification cake. Gypsum probably is converted to insoluble lime phosphates; iron, alumina and other metals are thrown out as insoluble phosphates; fluorides probably are converted to insoluble silicic acid and insoluble lime fluorides; and any rock slimes from phosphoric acid are of course separated out with the residue. The result is a purified solution of sodium vanadate containing probably other sodium salts, such as sodium sulphate, small amounts of lime, and phosphorus to the extent of not more than a few hundredths of a gram per liter. When vanadium pentoxide ($V_2O_5$) is precipitated from the purified solution by means of sulphuric acid ($H_2SO_4$), a substantially pure vanadium pentoxide ($V_2O_5$) product containing less than .02% phosphorus is produced.

Obviously, in a commercial operation the P. V. A. may vary in composition and variable amounts and proportions of reagents may be necessary. Temperatures of treatment and hydrogen ion concentrations (pH's) may be varied to give the best results. The invention provides a process for the treatment of P. V. A. with reagents such as milk of lime, soda ash and sulphuric acid in suitable amounts and proportions and under suitable conditions of temperature and alkalinity to produce a feasible commercial recovery of a substantially pure vanadium product.

We claim:

1. The method of recovering vanadium from substantially water-insoluble material containing phosphato vanadic acid which comprises reacting the material in an aqueous medium with an amount of calcium compound soluble in said medium sufficient to combine with a large proportion of the phosphorus present to form a substantially insoluble calcium phosphate but insufficient to combine with all of the phosphorus present, thus liberating vanadic acid and producing a solution of vanadic acid and a solid residue containing phosphorus and some vanadium, reacting the solid residue in contact with the solution with an amount of a sodium compound sufficient to combine with substantially all of the vanadium present to form a soluble sodium vanadate, thus producing a sodium vanadate solution contaminated with phosphorus and a solid residue containing only a small amount of vanadium but a large proportion of the phosphorus originally present in the vanadium-bearing material from which the residue was derived, the amount and type of sodium compound employed being such as to establish in the resulting vanadate solution a hydrogen ion concentration equivalent to a pH of about 7.5 to 7.7, subjecting the vanadate solution to the action of an amount of calcium compound soluble in said solution in slight excess of the amount required to combine with all of the phosphorus present as a contaminant to form a substantially insoluble calcium phosphate, thus producing a sodium vanadate solution substantially free of phosphorus and a solid precipitate containing phosphorus and a small amount of vanadium, the amount and type of calcium compound employed for the treatment of the vanadate solution being such as to establish in the resulting solution a hydrogen ion concentration equivalent to a pH of about 8.8 to 9.2, and separating the vanadate solution from the precipitate.

2. The method of recovering vanadium from substantially water-insoluble material containing phosphato vanadic acid which comprises reacting the material in an aqueous medium with an amount of calcium hydroxide sufficient to combine with a large proportion of the phosphorus present to form a substantially insoluble calcium phosphate but insufficient to combine with all of the phosphorus present, thus liberating vanadic acid and producing a solution of vanadic acid and a solid residue containing phosphorus and some vanadium, reacting the solid residue in contact with the solution with an amount of sodium carbonate sufficient to combine with substantially all of the vanadium present to form a soluble sodium vanadate, thus producing a sodium vanadate solution contaminated with phosphorus and a solid residue containing only a small amount of vanadium but a large proportion of the phosphorus originally present in the vanadium-bearing material from which the residue was derived, the amount of sodium carbonate employed being such as to establish in the resulting vanadate solution a hydrogen ion concentration equivalent to a pH of about 7.5 to 7.7, subjecting the vanadate solution to the action of an amount of calcium hydroxide in slight excess of the amount required to combine with all of the phosphorus present as a contaminant to form a substantially insoluble calcium phosphate, thus producing a sodium vanadate solution substantially free of phosphorus and a solid precipitate containing phosphorus and a small amount of vanadium, the amount of calcium hydroxide employed for the treatment of the vanadate solution being such as to establish in the resulting solution a hydrogen ion concentration equivalent to a pH of about 8.8 to 9.2, and separating the vanadate solution from the precipitate.

3. The method of recovering vanadium from a substantially water-insoluble material containing phosphato vanadic acid which comprises reacting the material in an aqueous medium with an amount of calcium compound soluble in said medium sufficient to combine with a large proportion of the phosphorus present to form a substantially insoluble calcium phosphate but insufficient to combine with all of the phosphorus present, thus liberating vanadic acid and producing a solution of vanadic acid and a solid residue containing phosphorus and some vanadium, reacting the solid residue in contact with the solution with an amount of a sodium compound sufficient to combine with substantially all of the vanadium present to form a soluble alkali metal vanadate, thus producing a sodium vanadate solution contaminated with phosphorus and a solid residue containing only a small amount of vanadium but a large proportion of the phosphorus originally present in the vanadium-bearing material from which the residue was derived, the amount and type of sodium compound employed being such as to establish in the resulting vanadate solution a hydrogen ion concentration equivalent to a pH of about 7.5 to 7.7, subjecting the vanadate solution to the action of an amount of calcium compound soluble in said solution in slight excess of the amount required to combine with all of the phosphorus present as a contaminant to form a substantially insoluble calcium phosphate, thus producing sodium vanadate solution substantially free of phosphorus and a solid precipitate containing phosphorus and a small amount of vanadium, the amount and type of calcium compound employed for the treatment of the vanadate solution being such as to establish in the resulting solution a hydrogen ion concentration equivalent to a pH of about 8.8 to 9.2, treating the resulting vanadate solution alternately with acid and a calcium compound one or more times, if necessary, to increase the hydrogen ion concentration of the solution and to re-establish in the solution a hydrogen ion concentration equivalent to a pH of about 8.8 to 9.2, thereby to effect further reduction of the phosphorus to about 3 to 5 grams per liter, and separating the vanadate solution from the precipitate.

4. The method of recovering vanadium from substantially water-insoluble material containing phosphato vanadic acid which comprises reacting the material in an aqueous medium with an amount of calcium hydroxide sufficient to combine with a large proportion of the phosphorus present to form a substantially insoluble calcium phosphate but insufficient to combine with all of the phosphorus present, thus liberating vanadic acid and producing a solution of vanadic acid and a solid residue containing phosphorus and some vanadium, reacting the solid residue in contact with the solution with an amount of sodium carbonate sufficient to combine with substantially all of the vanadium present to form a soluble alkali metal vanadate, thus producing sodium vanadate solution contaminated with phosphorus and a solid residue containing only a small amount of vanadium but a large proportion of the phosphorus originally present in the vanadium-bearing material from which the residue was derived, the amount of sodium carbonate employed being such as to establish in the resulting vanadate solution a hydrogen ion concentration equivalent to a pH of about 7.5 to 7.7, subjecting the vanadate solution to the action of an amount of calcium hydroxide in slight excess of the amount required to combine with all of the phosphorus present as a contaminant to form a substantially insoluble calcium phosphate, thus producing sodium vanadate solution substantially free of phosphorus and a solid precipitate containing phosphorus and a small amount of vanadium, the amount of calcium hydroxide employed for the treatment of the vanadate solution being such as to establish in the resulting solution a hydrogen ion concentration equivalent to a pH of about 8.8 to 9.2, treating the resulting vanadate solution alternately with acid and calcium hydroxide one or more times, if necessary, to increase the hydrogen ion concentration of the solution and to re-establish in the solution a hydrogen ion concentration equivalent to a pH of about 8.8 to 9.2, thereby to effect further reduction of the phosphorus to about 3 to 5 grams per liter, and separating the vanadate solution from the precipitate.

5. The method of recovering vanadium from substantially water-insoluble material containing phosphato vanadic acid which comprises reacting the material in an aqueous medium with an amount of calcium compound soluble in said medium sufficient to combine with a large proportion of the phosphorus present to form a substantially insoluble calcium phosphate but insufficient to combine with all of the phosphorus present, thus liberating vanadic acid and producing a solution of vanadic acid and a solid residue containing phosphorus and some vanadium, reacting the solid residue in contact with the solution with an amount of a sodium compound sufficient to combine with substantially all of the vanadium present to form a soluble sodium vanadate, thus producing a sodium vanadate solution contaminated with phosphorus and a solid residue containing only a small amount of vanadium but a large proportion of the phosphorus originally present in the vanadium-bearing material from which the residue was derived, the amount and type of sodium compound employed being such as to establish in the resulting vanadate solution a hydrogen ion concentration equivalent to a pH of about 7.5 to 7.7, subjecting the vanadate solution to the action of an amount of calcium compound soluble in said solution in slight excess of the amount required to combine with all of the phosphorus present as a contaminant to form a substantially insoluble calcium phosphate, thus producing sodium vanadate solution substantially free of phosphorus and a solid precipitate containing phosphorus and a small amount of vanadium, the amount and type of calcium compound employed for the treatment of the vanadate solution being such as to establish in the resulting solution a hydrogen ion concentration equivalent to a pH of about 8.8 to 9.2, separating the vanadate solution from the precipitate, and subjecting the separated vanadate solution to the action of a calcium compound in amount and of a type such as to establish therein a hydrogen ion concentration equivalent to a pH of about 10.2 to 10.6, thereby to reduce the amount of phosphorus in the solution to not more than about a trace.

6. The method of recovering vanadium from substantially water-insoluble material containing phosphato vanadic acid which comprises reacting the material in an aqueous medium with an amount of calcium hydroxide sufficient to combine with a large proportion of the phosphorus present to form a substantially insoluble calcium phosphate but insufficient to combine with all of the phosphorus present, thus liberating vanadic acid and producing a solution of vanadic acid and a solid residue containing phosphorus and some vanadium, reacting the solid residue in contact with the solution with an amount of sodium carbonate sufficient to combine with substantially all of the vanadium present to form a soluble sodium vanadate, thus producing a sodium vanadate solution contaminated with phosphorus and a solid residue containing only a small amount of vanadium but a large proportion of the phosphorus originally present in the vanadium-bearing material from which the residue was derived, the amount of sodium carbonate employed being such as to establish in the resulting vanadate solution a hydrogen ion concentration equivalent to a pH of about 7.5 to 7.7, subjecting the vanadate solution to the action of an amount of calcium hydroxide in slight excess of the amount required to combine with all of the phosphorus present as a contaminant to form a substantially insoluble calcium phosphate, thus producing sodium vanadate solution substantially free of phosphorus and a solid precipitate containing phosphorus and a small amount of vanadium, the amount of calcium hydroxide employed for the treatment of the vanadate solution being such as to establish in the resulting solution a hydrogen ion concentration equivalent to a pH of about 8.8 to 9.2, separating the vanadate solution from the precipitate, and subjecting the separated vanadate solution to the action of calcium hydroxide in an amount sufficient to establish therein a hydrogen ion concentration equivalent to a pH of about 10.2 to 10.6, thereby to reduce the amount of phosphorus in the solution to not more than about a trace.

7. The method of recovering vanadium from substantially water-insoluble material containing phosphato vanadic acid which comprises reacting the material in an aqueous medium with an amount of calcium compound soluble in said medium sufficient to combine with a large proportion of the phosphorus present to form a substantially insoluble calcium phosphate but insufficient to combine with all of the phosphorus present, thus liberating vanadic acid and producing a solution of vanadic acid and a solid residue containing phosphorus and some vanadium, reacting the solid residue in contact with the solution with an amount of a sodium compound sufficient to combine with substantially all of the vanadium present to form a soluble sodium vanadate, thus producing a sodium vanadate solution contaminated with phosphorus and a solid residue containing only a small amount of vanadium but a large proportion of the phosphorus originally present in the vanadium-bearing material from which the residue was derived, the amount and type of sodium compound employed being such as to establish in the resulting vanadate solution a hydrogen ion concentration equivalent to a pH of about 7.5 to 7.7, subjecting the vanadate solution to the action of an amount of calcium compound soluble in said solution in slight excess of the amount required to combine with all of the phosphorus present as a contaminant to form a substantially insoluble calcium phosphate, thus producing sodium vanadate solution substantially free of phosphorus and a solid precipitate containing phosphorus and a small amount of vanadium, the amount and type of calcium compound employed for the treatment of the vanadate solution being such as to establish in the resulting solution a hydrogen ion concentration equivalent to a pH of about 8.8 to 9.2, treating the resulting vanadate solution alternately with acid and calcium compound capable of reducing the hydrogen ion concentration one or more times, if necessary, to increase the hydrogen ion concentration of the solution and to re-establish in the solution a hydrogen ion concentration equivalent to a pH of about 8.8 to 9.2, thereby to effect further reduction of the phosphorus to about 3 to 5 grams per liter, separating the vanadate solution from the precipitate, and subjecting the separated vanadate solution to the action of calcium compound in an amount and of a type such as to establish therein a hydrogen ion concentration equivalent to a pH of about 10.2 to 10.6, thereby to reduce the amount of phosphorus in the solution to not more than about a trace.

8. The method of recovering vanadium from substantially water-insoluble material containing phosphato vanadic acid which comprises reacting the material in an aqueous medium with an amount of calcium hydroxide sufficient to combine with a large proportion of the phosphorus present to form a substantially insoluble calcium phosphate but insufficient to combine with all of the phosphorus present, thus liberating vanadic acid and producing a solution of vanadic acid and a solid residue containing phosphorus and some vanadium, reacting the solid residue in contact with the solution with an amount of sodium carbonate sufficient to combine with substantially all of the vanadium present to form a soluble sodium vanadate, thus producing a sodium vanadate solution contaminated with phosphorus and a solid residue containing only a small amount of vanadium but a large proportion of the phosphorus originally present in the vanadium-bearing material from which the residue was derived, the amount of sodium carbonate employed being such as to establish in the resulting vanadate solution a hydrogen ion concentration equivalent to a pH of about 7.5 to 7.7, subjecting the vanadate solution to the action of an amount of calcium hydroxide in slight excess of the amount required to combine with all of the phosphorus present as a contaminant to form a substantially insoluble calcium phosphate, thus producing sodium vanadate solution substantially free of phosphorus and a solid precipitate containing phosphorus and a small amount of vanadium, the amount of calcium hydroxide employed for the treatment of the vanadate solution being such as to establish in the resulting solution a hydrogen ion concentration equivalent to a pH of about 8.8 to 9.2, treating the resulting vanadate solution alternately with acid and calcium hydroxide one or more times, if necessary, to increase the hydrogen ion concentration of the solution and to re-establish in the solution a hydrogen ion concentration equivalent to a pH of about 8.8 to 9.2, thereby to effect further reduction of the phosphorus to about 3 to 5 grams per liter, separating the vanadate solution from the precipitate, and subjecting the separated vanadate solution to the action of calcium hydroxide in an amount sufficient to establish therein a hydrogen ion concentration equivalent to a pH of about 10.2 to 10.6, thereby to reduce the amount of phosphorus in the solution to not more than about a trace.

9. In a process for recovering vanadium from vanadium-bearing material containing phosphorus involving the production of an alkaline, aqueous vanadate solution containing phosphorus in an amount in excess of about 5 grams per liter, the improvement which comprises subjecting the vanadate solution to the action of calcium hydroxide to precipitate phosphorus contained therein, the amount of calcium hydroxide employed being not substantially in excess of the amount required to establish in the solution a hydrogen ion concentration equivalent to a pH of about 8.8 to 9.2.

10. In a process for recovering vanadium from vanadium-bearing material containing phosphorus involving the production of an alkaline aqueous vanadate solution containing phosphorus in an amount in excess of about 5 grams per liter, the improvement which comprises subjecting the vanadate solution to the action of calcium hydroxide to precipitate phosphorus contained therein, the amount of calcium hydroxide employed being not substantially in excess of the amount required to establish in the solution a hydrogen ion concentration equivalent to a pH of about 8.8 to 9.2, and thereafter subjecting the solution alternately to the action of sulphuric acid and calcium hydroxide one or more times to precipitate additional phosphorus.

11. In a process for recovering vanadium from vanadium-bearing material containing phosphorus involving the production of an alkaline aqueous vanadate solution containing phosphorus in an amount less than about 5 grams per liter, the improvement which comprises subjecting the vanadate solution to the action of calcium hydroxide to precipitate phosphorus contained therein, the amount of calcium hydroxide employed being not substantially in excess of the amount required to establish in the solution a hydrogen ion concentration equivalent to a pH of about 10.2 to 10.6.

12. In a process for recovering vanadium from vanadium-bearing material containing phosphorus involving the production of an alkaline aqueous vanadate solution containing phosphorus in an amount less than about 5 grams per liter, the improvement which comprises subjecting the vanadate solution to the action of calcium hydroxide to precipitate phosphorus contained therein, the amount of calcium hydroxide employed being not substantially in excess of the amount required to establish in the solution a hydrogen ion concentration equivalent to a pH of about 10.2 to 10.6, and thereafter subjecting the solution alternately to the action of sulphuric acid and calcium hydroxide one or more times to precipitate additional phosphorus.

FREDERICK F. FRICK.
FRANK W. WOODMAN.